Nov. 27, 1934.  A. WRIGHT  1,982,187
APPARATUS FOR COPYING GOFFERED FILMS
Filed Jan. 27, 1931
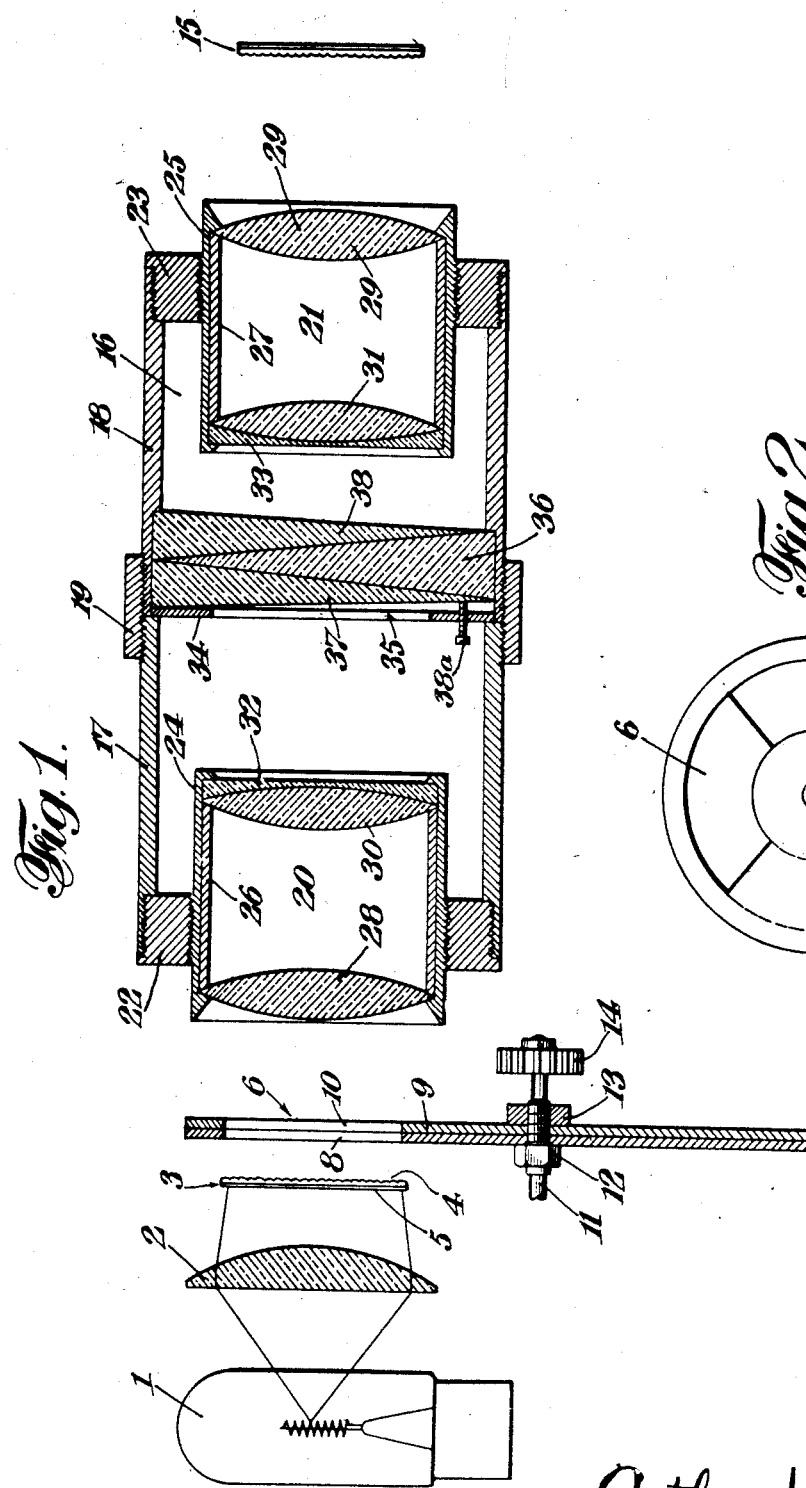
INVENTOR
Arthur Wright Patented Nov. 27, 1934

1,982,187

UNITED STATES PATENT OFFICE 1,982,187

APPARATUS FOR COPYING GOFFERED FILMS

Arthur Wright, Forest Hills, N. Y., assignor to Keller-Dorian Colorfilm Corporation, New York, N. Y., a corporation of Delaware Application January 27, 1931, Serial No. 511,453

4 Claims. (Cl. 88—24)

My invention relates particularly to an apparatus for copying goffered films, that is to say, films carrying lenticular elements adapted for the production of motion pictures in colors.

The object of my invention is to provide an apparatus whereby goffered films may be copied for the production of cinematographic or still pictures in colors. The object of my invention is particularly to copy lenticulated films in such a manner as to avoid moire effects. A further object is to provide an apparatus of a simple character whereby such moire effects may be avoided. My invention may be carried out, for instance, by producing dispersion of the image in a direction across the goffering, as for instance where transverse linear lenticles are carried by the film, although it is applicable to lenticulations of any other desired character, as for example, line gofferings arranged longitudinally of the film or picot gofferings.

While my invention is capable of being carried out in many different ways, for the purpose of illustration I have shown only one way of carrying out the same in the accompanying drawing, in which—

Fig. 1 is a vertical section of an apparatus for use in connection with my invention; and Fig. 2 is an elevation of the shutter with an adjustable opening adapted to be used therewith.

In the accompanying drawing, I have shown a source of light 1, which, if white light is desired, may be a Nernst light or an arc light or any other desired source of white light. In this way there may be obtained the desired dispersion, adapted to give a spectrum or a portion thereof which is substantially uniform. The source of light may, for instance, even be a source of colored light, adapted to give one or more color bands. In front of the source of light 1 there is provided a collimatric lens 2 to give a source of substantially parallel light, which is to be projected upon a goffered film 3 carrying cinematographic images that are to be copied. The goffered film 3, as shown in the drawing, may be provided with a transverse linear goffering 4 and an exposed, developed and inverted emulsion 5. The light from the original film 3 passes through an adjustable aperture 6 of a shutter comprised of a rear disk 7 having an opening 8 and a front disk 9 having an opening 10. By the relative degree of movement of adjustment of the two plates 7 and 9 the aperture 6 may be adjusted to any desired extent but may be, for example, an opening of 90°. The disks 7 and 9 are mounted on a shaft 11, the position of adjustment being maintained by adjusting-nuts 12 and 13. The shaft 11 is driven by a gear 14 from any suitable source of power so as to expose the film for the required time in the successive positions in which it is brought to rest by any suitable mechanism provided for advancing the film 3 from one picture to another while being copied. A new film 15 is provided from which the copy is to be made, the film 15 being constructed and moved in substantially the same manner, for example, as the film 3, an objective 16 being located between the films 3 and 15. This objective is comprised of a barrel mounting made into halves 17 and 18, which are held together by a ring 19 screw-threaded to the outside of the same. Two symmetric lens systems 20 and 21 are contained in the mounting, held in place by rings 22 and 23 respectively, fastened in the mounting and on tubes 24 and 25 respectively. Rings 26 and 27 therein hold their respective lenses in place. The lens systems 20 and 21 contain bi-convex lenses 28 and 29, bi-convex lenses 30 and 31 and plano-concave lenses 32 and 33. These lens systems 20 and 21 are of the usual well-known construction, as shown, for example, in original Fig. 4 of the application of Andre Oswald, Serial No. 17,724, filed March 23, 1925. The film 3 is in the focal plane of the objective 20, said objective having preferably a long focus to decrease cat's eye and Petzwal curve effects and the film 15 is in the focal plane of the objective 21, said objective preferably, also, having a long focus for the same reason, and a diaphragm 34 is in the focal planes of both objectives 20 and 21, located mid-way between the lens systems 20 and 21 but adjacent thereto. Accordingly, the luminous rays between the objectives 20 and 21 are parallel and the diaphragm 34, therefore, when seen from the positions of either of the films 3 and 15, appears to be at infinity. The lens systems 20 and 21 are preferably constructed so as to be corrected in the usual way for achromatism, spherical aberration and astigmatism. At one side of the diaphragm there is provided a direct vision composite prism 35, that is to say a prism, such for instance as a triple Amici dispersion prism, as referred to, for example, in Von Rohr "The Formation of Images", p. 469 et seq., London, 1920, His Majesty's Stationery Office, adapted to produce dispersion but not any substantial deviation of the rays, at least, along the axis thereof, this being comprised of a flint glass prism 36 and two crown glass prisms 37 and 38, the angles of the two prisms 37 and 38 together being preferably 1.2 times the angle of the prism 36. This ratio may be varied according to the particular light used. The composite prism may be held in place by an adjustable screw 38a. These three prisms are thus arranged so as to disperse the rays of the image in a direction transverse to the line goffering, but preferably not to substantially deviate said rays. In other words, there will be a spectrum formed to some extent while the direction of the rays is maintained. This dispersion is preferably so arranged as to disperse the light when it reaches the film 15 crosswise of the linear gofferings of the film 15. This avoids any shifting of the image lengthwise of the goffering. The dispersion may be to any desired extent, but preferably to an extent of from ½ to 1½ lines of goffering on the film 15. Where the gofferings on the film 15 are 20 to the millimeter, this will be a dispersion at the film of from 1/40 to 3/40 mm. However, owing to the fact that the edges of the spectrum thus formed by the composite prism 35 will have no exactly definite delimitation, it is not entirely necessary to have a mathematically exact amount of dispersion of the image on the film 15. Fine adjustments of the exact amount of dispersion caused by the composite prism 35 are, therefore, not entirely necessary. However, if greater or less amounts of dispersion are desired, this can be done by correspondingly increasing or decreasing the angles and dimensions or thicknesses of the prisms 36, 37 and 38.

In copying films as above indicated, accordingly, there will be a certain amount of color produced by the spectrum dispersion but such colors do not enter into the original colors from which the images on the film 3 are taken, nor into the ultimate colors produced by the projecting from the film 15. The purpose of the dispersion is merely to extend to a small degree the particular image in a direction transverse to the goffering in order to effectively eliminate the moire effects. The film 15 may be developed and inverted in the usual way, or completed in any other desired way.

While I have described my invention above in detail I wish it to be understood that many changes may be made therein without departing from the spirit of the same.

I claim:

1. In a cinematographic apparatus adapted to remove moire effects, the combination of a goffered film having gofferings arranged in lines and means for reproducing the same, comprising an objective and a prism having the physical property of spreading the light by optical dispersion to the extent of ½ to 1½ lines of goffering substantially only transversely of the lines of goffering substantially without deviation.

2. An apparatus adapted for copying line goffered films while avoiding moire effects, comprising a symmetrical objective, means associated therewith having the physical property of spreading the light of the entire field transmitted by optical dispersion substantially only across the goffering without substantially deviating the axis of the rays, and a diaphragm located mid-way between the parts of the symmetrical objective, said means being located adjacent the diaphragm.

3. An apparatus adapted for copying line goffered films while avoiding moire effects, comprising an objective and means including a direct vision composite prism comprising a flint glass prism of large angle and two crown glass prisms of smaller angles, respectively, associated therewith having the physical property of spreading the light by optical dispersion across the goffering without substantially deviating the axis of the rays.

4. An apparatus adapted for copying line goffered films while avoiding moire effects, comprising an objective and means including a direct vision composite prism comprising a flint glass prism of large angle and two crown glass prisms of smaller angles, respectively, associated therewith having the physical property of spreading the light by optical dispersion across the goffering.

ARTHUR WRIGHT.